United States Patent
Shimomura

[15] 3,641,489
[45] Feb. 8, 1972

[54] STEERING COLUMN LOCK FOR VEHICLES

[72] Inventor: Yoshisada Shimomura, Tokyo-to, Japan
[73] Assignee: Yushin Seiki Kogyo Kabushiki Kaisha, Tokyo, Japan
[22] Filed: Oct. 8, 1969
[21] Appl. No.: 864,767

[30] Foreign Application Priority Data
Oct. 12, 1968 Japan...................43/88705

[52] U.S. Cl. ..................340/52 D, 70/252, 180/114, 200/44
[51] Int. Cl. ......................B60r 25/02, B60r 25/10
[58] Field of Search..............340/52 D; 70/252; 200/44; 307/10 AT; 180/114

[56] References Cited

UNITED STATES PATENTS 2,063,088   12/1936   Gerald...................70/252
3,138,780   6/1964   Jacobsen.................340/52 D Primary Examiner—Donald J. Yusko
Assistant Examiner—Glen R. Swann, III
Attorney—Steinberg & Blake

[57] ABSTRACT

A retractable steering column lock for vehicles. The lock is urged by a spring to a locking position and can be retracted from the locking position into a retracted position releasing the steering column for turning movement. A rotary key-operated assembly forms part of the ignition switch structure and coacts through a motion transmission with the lock for retracting the latter to its retracted position when the ignition switch is turned on. A swingable lever assembly responds to turning on of the ignition switch for releasably holding the lock in its retracted position while when the ignition switch is turned off and the key is withdrawn, the lock is automatically released for return to its locking position.

3 Claims, 6 Drawing Figures

PATENTED FEB 8 1972 3,641,489

INVENTOR
YOSHISADA SHIMORURA
BY
Steinberg & Blake
ATTORNEYS

PATENTED FEB 8 1972

INVENTOR
YOSHISADA SHIMORURA
BY
Steinberg & Blake
ATTORNEYS

STEERING COLUMN LOCK FOR VEHICLES

BACKGROUND OF THE INVENTION

The present invention relates to locking devices for releasably locking the steering column of a vehicle so that the vehicle cannot be driven when it is broken into by unauthorized people.

Conventional structures of this type generally make it possible to render the steering column lock operative when the ignition key is removed from the ignition switch while rendering the steering column lock inoperative when the key is introduced into the ignition switch of the vehicle and the ignition is turned on. Thus, such conventional constructions include mechanism for sensing movement of a key into and out of the ignition switch and for providing a corresponding operation of the steering column lock in response to sensing of the presence or absence of this key. Such mechanisms, particularly the mechanism which responds to the presence or absence of a key and actuates the steering column lock accordingly are relatively complex, expensive, difficult to install, subject to faulty operation, and of relatively short operating life.

SUMMARY OF THE INVENTION

It is accordingly a primary object of the present invention to provide a construction of the above general type which will greatly improve the present state of the art.

Thus, it is an object of the invention to provide a construction of the above type which can be operated very smoothly in response to operation of the ignition key so that the operator will not be required at any time to force movable parts to carry out required displacements. For example, when the direction of movement of the key is changed, it frequently happens with conventional constructions that considerable resistance to turning of the key must be overcome, whereas it is an object of the invention to avoid any such resistance to movement of the components.

In addition, it is an object of the present invention to provide a construction which is simple to manufacture, requires an extremely small number of simple, rugged components, and produces a unit which is easy to install, which has a long operating life, and which has many advantages from the standpoint of manufacturing and practical use of the construction, such as relatively easy operations during insertion and withdrawal of the key.

Furthermore, it is an object of the present invention to provide a construction of this type which will have a practically faultless operation during its long operating life while at the same time being extremely inexpensive to operate, purchase, and maintain.

In addition, it is an object of the invention to provide a construction of this type which is capable of warning the operator that the key has been left in the ignition switch lock, in the event that the operator seeks to leave the vehicle without removing the key, so that in this way also a reliable operation of the steering column lock is assured and further safety is achieved.

In accordance with the invention, the structure includes a retractable lock means movable between a locking position, preventing turning of a steering column, and a retracted position releasing the steering column for free turning movement. A spring means coacts with this lock means for urging the latter to its locking position. A key-operated means is supported for rotary movement and forms part of a structure for actuating the ignition switch, this key-operated means being adapted to receive a key by means of which the latter means is manually operated. A motion-transmitting means is operatively connected with the key-operated means for movement therewith and transmits the turning movement thereof to the retractable lock means for retracting the latter from its locking to its retracted position in opposition to the spring means when the key-operated means is turned from an off to an on position. Finally, the combination of the invention includes a releasable holding means which operates automatically to releasably hold the lock means in its retracted position, in opposition to the force of the spring means, as long as the key-operated means is in the on position. When the latter is turned back to the off position, the releasable holding means responds automatically to release the lock means for return to its locking position by the spring means.

BRIEF DESCRIPTION OF DRAWINGS

The invention is illustrated by way of example in the accompanying drawings which form part of this application and in which:

FIG. 6 is schematic wiring diagram of the circuitry of the warning system.

DESCRIPTION OF PREFERRED EMBODIMENTS

Figure 1:
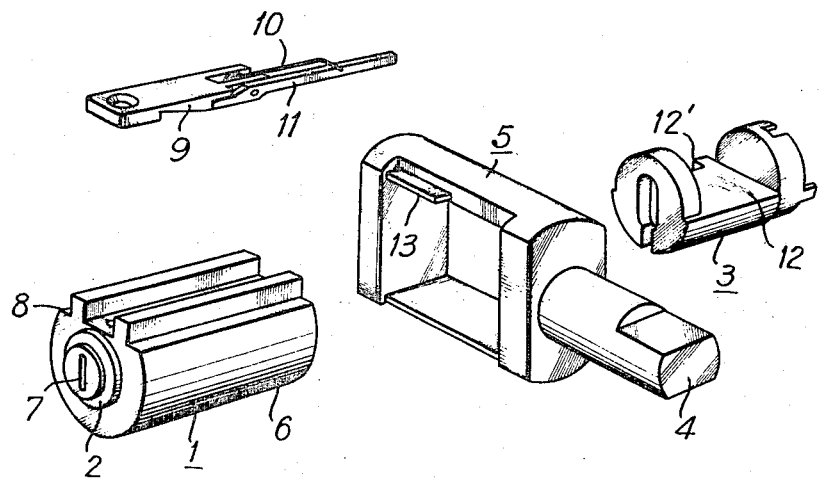
FIG. 1 is an exploded perspective illustration of part of the structure of the invention.

Referring to the drawings, FIG. 1 shows a support means 1 in the form of a hollow substantially cylindrical body having, however, a flat upper surface from which a pair of axially extending ribs project upwardly in the manner shown most clearly in FIG. 1. This support means 1 remains stationary during the operations and supports for rotary movement, in its hollow interior, a rotary key-operated means 2 which forms the key-receiving component of a ignition-switch actuating assembly as is present on most modern vehicles such as passenger automobiles and the like. The inner end of the rotary key-operated means 2 is fixed to a rotary motion-transmitting means 3 which will turn with the key-operated means 2. Thus, as is apparent from FIG. 1, the end of the motion-transmitting means 3 which is nearest to the inner end of the rotary means 2 is formed with an elongated opening, and this opening receives with a tight, press fit, for example, a projection at the inner end of the key-operated means 2 which is of a configuration matching that of this opening, so that in this way the components 2 and 3 are connected to each other for turning movement as a unit.

The structure also includes a retractable lock means 5 having at one end a locking projection 4 the outer end of which is adapted to be received in an opening of a steering column, this opening having a configuration matching the noncircular configuration of the outer end of the lock member 4. The retractable lock means 5 includes, fixed to the projection 4, an elongated rigid body of metal or plastic formed with a substantially rectangular opening passing therethrough as is particularly apparent from FIG. 1. The motion-transmitting means 3 extends through this rectangular opening of the body of the lock means 5, and between its opposed ends the motion-transmitting means 3 is cut away so as to have a substantially semicircular cross section providing the means 3 between its ends with a flat camming surface 12. This part of the motion-transmitting means 3 is also provided with a camming projection 12' visible in FIG. 1. When the lock means 5 is in its locking position, the left vertical inner surface of the body of lock means 5, which is visible in FIG. 1, will rest flat against the camming surface 12 of the motion-transmitting means 3, with the parts having the position at this time which is shown most clearly in FIG. 2. A spring means 15 coacts with the end of the lock means 5 distant from the locking projection 4 thereof in order to urge the lock means 5 to its locking position illustrated in FIG. 2.

Thus, the support means 1 includes an outer cylinder 6 to support the key-operated means 2 for rotary movement, and this key-operated means 2 is formed with a key-receiving recess 7 into which the operating key is introduced in a conventional manner. With the structure of the invention, however, there is a releasable holding means for releasably holding the lock means 5 in its retracted position, and this releasable holding means includes the assembly of levers 9, 11 and a displaceable member 8 in the form of a spherical ball which is displaced upon introduction of a key into the keyhole 7 in order to actuate the releasable holding means 8–11. Thus, when a key is introduced into the key-operated means 2, the ball 8 will be displaced upwardly out of a recess in which it is located when in the dotted-line position shown in FIG. 3 into the upper solid-line position shown in FIG. 3 where the ball member 8 is located just outside of and flush with the exterior surface of the rotary key-operated means 2. Therefore when the latter is turned after introduction of a key, the ball member 8 will be in rolling contact with the exterior surface of the key-operated means 2 and will remain in the outer solid-line position shown in FIG. 3.

In addition to the ball member 8, the releasable holding means includes the pair of levers 9 and 11 which are pivoted to each other by way of a common pivot pin which extends transversely across the space between and is carried by the pair of upper ribs shown in FIG. 1 projecting upwardly from the top flat surface of the substantially cylindrical body 6. The levers 9 and 11 are received between these ribs and are turnable about the common axis of the common pivot pin which extends between and is carried thereby. As is apparent from FIGS. 1 and 3, at its right end the lever 9 has a free end portion overlapping a left end of the lever 11 situated to the left of the pivot axis, so that the lever 11 is limited in its clockwise turning beyond the position shown in FIG. 3 by engagement of the left end of the lever 11 with the right end of the lever 9, as viewed in FIG. 3. On the other hand, the lever 9 can turn in a clockwise direction with respect to the lever 11, as viewed in FIG. 3, and the lever 9 fixedly carries a leaf spring 10 which bears downwardly against the lever 11 to urge the latter in a clockwise direction, as viewed in FIG. 3. Thus, when the lever 11 is turned in a counterclockwise direction with respect to the lever 9, as viewed in FIG. 3, it is possible for the spring 10 to yield while immediately returning the lever 11 to the position thereof shown in FIG. 3 with respect to the lever 9 when the lever 11 is free to turn in a clockwise direction.

Figure 3:
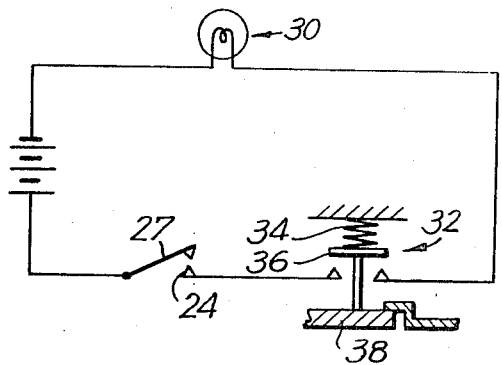
FIG. 3 is a partly broken away and partly sectional schematic elevation showing further details of the structure of the invention.
Figure 3:
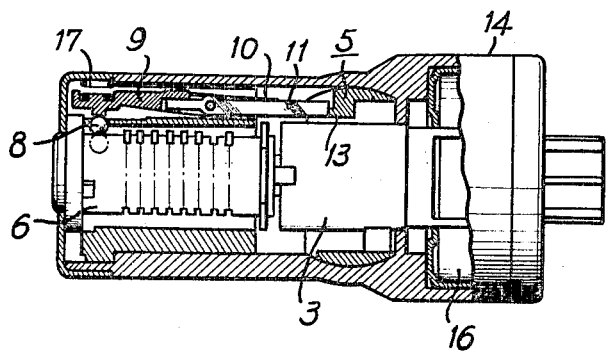

The lock means 5 includes along the upper surface of the rectangular opening thereof an elongated portion 13 which extends beneath the lever 11 and holds the latter turned in a counterclockwise direction from the position thereof shown in FIG. 3, in opposition to the spring 10, as long as the lock means 5 is in its locking position. However, when the lock means 5 is sufficiently retracted away from its locking position, the free end of the elongated portion 13, situated between the ends of the rectangular opening, will move beyond the lever 11 so that the spring 10 can immediately displace the lever 11 to the position shown in FIG. 3 where it extends in the path of movement of the elongated portion 13 when the latter is moved by the spring 15 to the lock position, and as a result this releasable holding means will act through the parts 11 and 13 to hold the lock means effectively in its retracted position in opposition to the force of the spring means 15.

Figure 2:
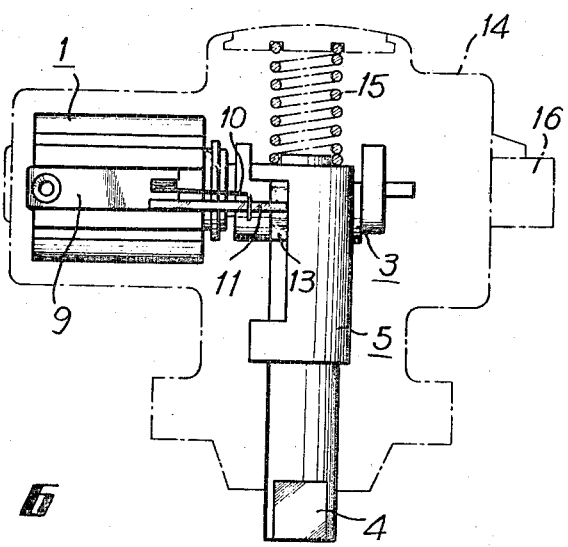
FIG. 2 is a schematic top plan view showing the steering column lock of the invention in its assembled condition.

As may be seen from the phantom lines in FIG. 2, the above-described structure is adapted to be situated within a suitable housing 14 in which the spring means 15 is accommodated together with the remaining structure described above. As is apparent from FIG. 3, the structure includes an additional coil spring 17 compressed between a wall of the housing 14 and receiving a boss at the free end of the lever 9 distant from the lever 11 so that the spring 17 urges the lever 9 in a counterclockwise direction, as viewed in FIG. 3. As is also apparent from FIG. 3, this free end of the lever 9 has an additional projection formed, for example, with a concave surface forming part of a sphere of the same magnitude as the ball 8 to receive the latter with a sliding contact so that the ball 8 is free to rotate with respect to the left free end of the lever 9, as viewed in FIG. 3, while remaining in operative engagement therewith in the manner shown in FIG. 3.

Furthermore, there is schematically illustrated in FIGS. 2 and 3 the switch assembly 16 which is actuated by the free end of the motion-transmitting means 3 which is distant from the key-operated means 2. Thus, when the key-operated means 2 is turned from its off to its on position, the switch 16 is turned from its open to its closed position, and in this way the electrical system of the vehicle is energized.

It should be noted that although the projecting portion 12' of the camming surface 12 appears relatively short in FIG. 1, this is only due to the perspective illustration of the components and actually the projection 12' extends approximately through half the distance between the opposed ends of motion-transmitting means 3 where they extend from the camming surface 12.

The housing 14 is fixedly mounted on the outer tubular casing in which the steering column is located in any suitable manner as by being bolted or fixedly strapped thereto, and the rotary steering column is formed with an opening to receive the free end of the lock projection 4, as pointed out above. If it should happen that when the vehicle is stopped the opening of the steering column is not in line with the lock projection 4, the operation need only turn the steering column until the lock projection 4 snaps into the opening of the steering column. Thus, when the projection 4 snaps into the corresponding opening of the steering column the spring 15 can expand to situate the retractable lock means 5 in its locking position shown in FIG. 2.

Assuming now that the parts are in the position of FIG. 2 with the steering column locked against turning movement and with the key out of the key-operated means 2, it will be seen that this is the normal position of the vehicle when it is not used. At this time the ball 8 is in its lower dotted-line position shown in FIG. 3, received in a suitable recess of the key-operated means 2, and the spring 17 is expanded so that the levers 9, 11 are angularly positioned in a counterclockwise direction beyond the position thereof shown in FIG. 3 with the lever 11 actually situated upwardly beyond the upper surface of the elongated portion 13 which extends freely beneath the free end of the lever 11 in the position of the parts shown in FIG. 2.

When it is desired to operate the vehicle the operator will of course introduce a key into the keyhole 7. The result is that the key will displace the ball 8 upwardly to the solid-line position shown in FIG. 3, and as a result the lever 9 is turned in a clockwise direction to the position shown in FIG. 3, in opposition to the spring 17 which is further compressed at this time. Of course, the spring 10 will act on the lever 11 to urge the latter to follow the turning movement of the lever 9, but the elongated portion 13 will prevent such turning movement of the lever 11 from taking place.

Now the operator will turn the key in a clockwise direction as viewed from the front of the dash, and the result is that the motion-transmitting means 3 will turn with the key-operated means 2 while the switch 16 is advanced toward its closed position, and thus the camming portion 12, 12' of the motion-transmitting means 3 will act on the lock means 5 to retract the latter in opposition to the force of the spring 15 toward the fully retracted position of the lock means 5 where the projection 4 is situated out of the opening of the steering column so that the latter is released for turning movement.

These operations continue until the elongated portion 13 moves just beyond the lever 11 so that the spring 10 can now turn the lever 11 to the position of FIG. 3 where the lever 11 is situated in line with and in the path of movement of the free end of the elongated portion 13, so that the spring 15 cannot return the lock means 5 from its retracted to its locking position until the releasable holding means which includes the lever 11 is displaced to its release position. In the retracted position of the lock means 5 the motion-transmitting means 3 has been turned for approximately 90° so that the projection 12' is apparent in FIG. 3, and the manner in which the upper inner surface of the rectangular opening of the body of lock means 5 is stepped to accommodate the projection 12' is also apparent from FIG. 3.

Thus, with further clockwise turning of the key the parts will remain in the unlocked position, and even when the key is returned toward its initial off position, the parts will still remain in the unlocking position. Thus, the lever 11 of the releasable holding means coacts with the free end of the elongated portion 13 of the retractable lock means to maintain the latter in its retracted position.

It is only when the key-operated means 2 has been turned back all the way up to its off position that it becomes possible for the ball 8 to drop back down into the recess where the ball 8 is accommodated in the dotted-line position shown in FIG. 3, and now the spring 17 can expand to turn the levers 9,11 as a unit in a counterclockwise direction displacing the lever 11 upwardly beyond the portion 13 so that the spring 15 can now expand to return the lock means 5 to its locking position. It is to be noted that these operations will not take place until the key is removed. Even when the key-operated means 2 has been turned all the way back to its initial off position, the parts will remain in the position shown in FIG. 3 with the lock means 5 retracted until the key is removed out of the key-operated means 2 so as to release the ball 8 for return to its dotted-line position shown in FIG. 3.

Thus, with the structure of the invention the displaceable member 8 of the releasable holding means senses the presence or absence of a key in the key-operated means 2 and it is the movement of the displaceable member 8 which brings about a conditioning of the levers 9,11 to provide either for releasable holding of the lock means in its retracted position or for release thereof for return to the locking position. This structure operates very smoothly without any substantial resistance to turning of the key in either direction so that many manufacturing advantages are achieved and a practical use of the structure with a long operating life and easy operation thereof, particularly during insertion and removal of the key, are assured. It is to be noted that the number of components required is extremely small so that the parts can be inexpensively manufactured while at the same time having rugged construction and easy assembly, contributing toward a long trouble-free operating life.

Figure 4:
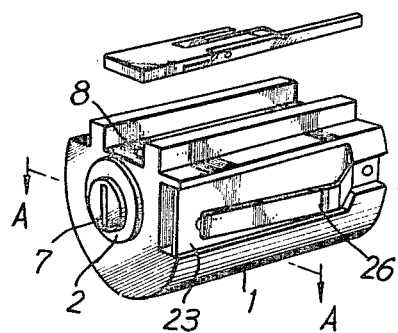
FIG. 4 is a perspective exploded illustration of the key-receiving part of the structure of the invention provided with a structure for giving a warning that the key has not been removed.
Figure 5:
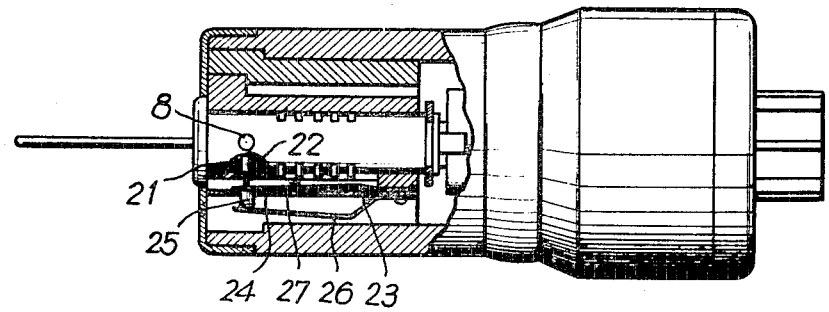
FIG. 5 is a partly sectional schematic top plan view of the structure of FIG. 4 showing the structure with a key in the key-operated means.

It is apparent from the above description that if the operator of the vehicle should leave the vehicle without removing the key from the key-operated means 2, then the lock means 5 will not in fact be returned to its locking position and the entire structure would not effectively prevent movement of the parked vehicle if the latter were broken into by an unauthorized person. Furthermore, where the vehicle has doors which automatically lock, if the key is left in the vehicle, in the key-operated means 2, it would not be possible for the operator to open the door of the vehicle once it has been locked unless the operator happens to have a spare key. It is therefore highly desirable to provide a construction which will warn the operator that the key has not been removed, and FIGS. 4-6 illustrate a modification of the structure of the invention to include such a warning arrangement. With this construction an electrically operated warning device such as a buzzer or a warning lamp is energized if the operator opens the door of the vehicle while the key remains in the keyhole 7. In the example illustrated schematically in FIG. 6 there is a warning lamp 30 situated so that it is clearly visible to the operator and this warning lamp will become energized under the above conditions.

Referring to FIG. 5 which shows the key-operated means 2 with a key therein, this key-operated means 2 is formed with a transverse bore 21 passing radially through the wall thereof to communicate with the keyhole 7 which receives the key. A substantially cylindrical pin 22 is freely slidable in the bore 21 which with the pin 22 is angularly displaced by about 90° from the recess which receives the ball 8. When the key is introduced not only is the bore member 8 displaced outwardly, as described above, but in addition the pin 22 is engaged by the key to be displaced radially away from the axis of the key-operated means 2, and the pin 22 will now be in the position shown in FIG. 5.

The substantially cylindrical body 6 of the support means 1 is illustrated in section in FIG. 5 and is formed with an opening which is aligned with the bore 21 when the key-operated means 2 is in its off position. This opening of the body 6 receives a reduced-diameter portion of a thrust pin 25, and when the pin 22 is displaced outwardly to the position shown in FIG. 5 it is possible for the key-operated means 2 to rotate so that its outer surface will engage the reduced inner portion of the thrust pin 25 which does not turn with the key-operated means 2. However, when the key-operated means 2 is returned to its off position the thrust pin 25 will again be in operative engagement with the outer end of the pin 22 so as to urge the latter inwardly toward the axis of the key-operated means 2.

The body 6 is formed with an elongated axial groove which accommodates a leaf spring 27 forming part of a normally open switch which is illustrated in FIG. 6. An elongated strip 23 of insulating material is fixed to the body 6 and extends along the axial groove thereof which communicates with the bore which receives the reduced inner end of the thrust pin 25, and this plate of nonconductive insulating material 23 fixedly carries a stationary contact 24 of the normally open switch illustrated in FIG. 6. The thrust pin 25 has an outer portion of enlarged diameter extending through an opening of the insulating plate 23 and a free end of the leaf spring 26 presses the thrust pin 25 inwardly toward the axis of the key-operated means 2. In this way the parts have the exterior appearance illustrated in FIG. 4 while they coact in the manner shown in the sectional illustration of FIG. 5.

The normally open switch 24, 27 is located in the circuit of FIG. 6 in series with a normally closed switch 32 which includes a spring 34 urging the switch member 36 toward its closed position. As long as the door 38 of the vehicle remains in the closed position shown schematically in FIG. 6, the switch 32 is maintained open in opposition to the spring 34. However, upon opening of the door 38, the spring 34 can expand to place the switch 32 in its closed position.

Thus, with this construction as long as the key is in the key-operated means 2, the normally open switch 24,27 will be closed. If under these conditions the door 38 is opened, the switch 32 will also close so as to immediately energize the warning device 30, letting the operator know that he is about to leave the vehicle without having removed the key. It is to be noted that this operation is provided not only when the ignition switch is turned off and the operator leaves the nonrunning vehicle without removing the key, but also when the vehicle stops and the operator leaves the engine running and opens the door of the vehicle to leave the latter. Under these latter conditions also the warning device 30 will be energized, so that the structure of the invention operates even when the vehicle stops even though the engine has not been turned off.

If, after returning the key-operated means 2 to its off position, the operator removes the key, then the normally open switch 24, 27 will be automatically placed in its open position by displacement of thrust pin 25 inwardly by spring 26 so as to displace the springy switch member 27 away from the contact 24. Now when the operator opens the door 38, the switch 32 closes but because the switch 24,27 is open the warning device 30 will not be energized.

Thus, with the structure of the invention the operator will be warned that the steering column lock has not been returned to its locking position when the operator seeks to leave the vehicle. The warning structure shown in FIGS. 4-6 is exceedingly simple and very effective. All of the parts described above in connection with FIGS. 1-3 remain unchanged, and it is only required to provide an additional bore 21 in the key-operated means 2 in order to accommodate the pin 22. The switch structure carried by the body 6 is extremely simple and easily accommodated.

What is claimed is:

1. For use in a vehicle having a steering column, retractable lock means movable between a locking position preventing turning of the steering column and a retracted position releasing the steering column for turning movement, spring means coacting with said retractable lock means for urging the latter to said locking position thereof, rotary, key-operated means forming part of an ignition switch assembly, said key-operated means being turnable between on and off positions when actuated by a key, motion-transmitting means coacting with said key-operated means for transmitting movement from the latter to said retractable lock means for retracting the latter to said retracted position thereof when said key-operated means is turned from said off to said on position thereof and for releasing said lock means for movement from said retracted to said locking position by said spring means when said key-operated means is returned from said on to said off position, and releasable holding means coacting with said key-operated means and with said lock means for releasably holding said lock means in opposition to said spring means in said retracted position when said key-operated means is turned from said off to said on position and for releasing said lock means for movement by said spring means to said locking position thereof when said key-operated means is turned from said on to said off position, and a key is withdrawn therefrom, a support means surrounding and carrying said rotary key-operated means, said releasable holding means including a pair of levers pivotally connected to each other and carried by said support means for turning movement about a common axis, said levers coacting with each other for turning movement as a unit in a direction releasing said lock means for return by said spring means to said locking position and for independent movement when turning in an opposite direction, one of said levers engaging and coacting with said releasable lock means and the other of said levers coacting with said rotary key-operated means, said releasable holding means including a spring acting on said one lever for urging the latter with respect to said other lever to the position it has with respect thereto when said levers turn in the direction releasing said lock means for return to said locking position thereof, said releasable holding means including a displaceable member responding to insertion of a key in said key-operated means for displacement to a position turning said other lever with respect to said one lever in a direction opposite to the release direction, said lock means having an elongated portion engaging said one lever when said lock means is in said locking position thereof for limiting turning of said one lever with said other lever in said direction opposite to said reverse direction, said one lever being moved by said spring of said releasable holding means into the path of locking movement of said elongated portion of said lock means when said elongated portion is retracted beyond said one lever during displacement of said lock means from said locking to said retracted position thereof, so that said one lever coacts with said elongated portion of said lock means for releasably maintaining the latter retracted in opposition to said spring means, and an additional spring coacting with said other lever for swinging the latter and said one lever therewith in the release direction upon withdrawal of a key from said key-operated means after the latter has been returned from said on to said off position, said additional spring acting through said other lever to return said displacing member into the path of movement of a key which will subsequently be introduced again into said key-operated means.

2. For use in a vehicle having a steering column, retractable lock means movable between a locking position preventing turning of the steering column and a retracted position releasing the steering column for turning movement, spring means coacting with said retractable lock means for urging the latter to said locking position thereof, rotary, key-operated means forming part of an ignition switch assembly, said key-operated means being turnable between on and off positions when actuated by a key, motion-transmitting means coacting with said key-operated means for transmitting movement from the latter to said retractable lock means for retracting the latter to said retracted position thereof when said key-operated means is turned from said off to said on position thereof and for releasing said lock means for movement from said retracted to said locking position by said spring means when said key-operated means is returned from said on to said off position, and releasable holding means coacting with said key-operated means and with said lock means for releasably holding said lock means in opposition to said spring means in said retracted position when said key-operated means is turned from said off to said on position and for releasing said lock means for movement by said spring means to said locking position thereof when said key-operated means is turned from said on to said off position, and a key is withdrawn therefrom, wherein said motion-transmitting means is connected with said rotary key-operated means for turning movement therewith and includes a camming portion engaging a portion of said lock means for camming the latter in opposition to said spring means to said retracted position upon turning of said key-operated means from said on position thereof, said lock means being in the form of a body formed with a substantially rectangular opening passing therethrough and having a locking projection extending therefrom, said motion-transmitting means extending through said opening of said body and having within said opening said camming portion which engages a portion of said body which defines part of said opening thereof, a support means surrounding and carrying said rotary key-operated means, said releasable holding means including a pair of levers pivotally connected to each other and carried by said support means for turning movement about a common axis, said levers coacting with each other for turning movement as a unit in a direction releasing said lock means for return by said spring means to said locking position and for independent movement when turning in an opposite direction, one of said levers engaging and coacting with said releasable lock means and the other of said levers coacting with said rotary key-operated means, said releasable holding means including a spring acting on said one lever for urging the latter with respect to said other lever to the position it has with respect thereto when said levers turn in the direction releasing said lock means for return to said locking position thereof, said releasable holding means including a displaceable member responding to insertion of a key in said key-operated means for displacement to a position turning said other lever with respect to said one lever in a direction opposite to the release direction, said lock means having an elongated portion engaging said one lever when said lock means is in said locking position thereof for limiting turning of said one lever with said other lever in said direction opposite to said release direction, said one lever being moved by said spring of said releasable holding means into the path of locking movement of said elongated portion of said lock means when said elongated portion is retracted beyond said one lever during displacement of said lock means from said locking to said retracted position thereof, so that said one lever coacts with said elongated portion of said lock means for releasably maintaining the latter retracted in opposition to said spring means, and an additional spring coacting with said other lever for swinging the latter and said one lever therewith in the release direction upon withdrawal of a key from said key-operated means after the latter has been returned from said on to said off position, said additional spring acting through said other lever to return said displacing member into the path of movement of a key which will subsequently be introduced again into said key-operated means.

3. The combination of claim 1 and wherein a warning switch means coacts with said key-operated means for assuming a closed position as long as a key is not withdrawn from said key-operated means even when the latter is returned to said off position thereof, so that said warning switch means can form part of a circuit for warning the operator of the vehicle that the key has not been withdrawn from said key-operated means when the operator opens a door of the vehicle, whereby the operator will be reminded to withdraw the key from the key-operated means to free said releasable holding means for movement to said release position so that said lock means can assume said locking position thereof preventing turning of the steering column.

* * * * *